United States Patent [19]

Keller et al.

[11] 4,037,010

[45] July 19, 1977

[54] ORGANIC COMPOSITES WITH IN-SITU FORMED FIBERS AND EXTENSIBLE MATRIX

[75] Inventors: Leon Brian Keller, Palos Verdes Estates; Raymond E. Kelchner, Jr., Los Angeles, both of Calif.

[73] Assignee: Hughes Aircraft Company, Culver City, Calif.

[21] Appl. No.: 711,000

[22] Filed: Aug. 2, 1976

[51] Int. Cl.² .......................... B32B 5/02; B32B 5/04
[52] U.S. Cl. .................................. 428/290; 428/297; 428/360; 428/361; 428/904; 428/909
[58] Field of Search ............... 428/292, 297, 360, 904, 428/909, 290, 361

[56] References Cited

U.S. PATENT DOCUMENTS

| 3,743,272 | 7/1973 | Nowotny | 264/69 |
| 3,796,778 | 3/1974 | Gallacher | 264/49 |
| 3,811,923 | 5/1974 | Hammer et al. | 428/297 |

FOREIGN PATENT DOCUMENTS

| 1,218,191 | 1/1971 | United Kingdom | 428/904 |

*Primary Examiner*—J.C. Cannon
*Attorney, Agent, or Firm*—Booker T. Hogan, Jr.; W. H. MacAllister

[57] ABSTRACT

Composite materials are disclosed which consist of extensible polymer matrices in combination with three-dimensionally structured, interconnected fibrous masses which are formed "in situ". These composites exhibit novel mechanical characteristics which are distinctly different from those exhibited by conventional fiber-filled elastomers.

8 Claims, 6 Drawing Figures

ORGANIC COMPOSITES WITH IN-SITU FORMED FIBERS AND EXTENSIBLE MATRIX

RELATED APPLICATIONS

In application Ser. No. 616,747, filed Sept. 25, 1975, by L. Brian Keller and Robert K. Jenkins, a novel process for forming polymeric fibers "in situ" was disclosed. The present invention differs from that of this related disclosure in that Applicants herein have found a non-obvious way to extend the technology of the related application to yield composite materials having extensible matrices which exhibit totally different physical characteristics from those composites prepared from fibers formed by the related application teachings.

BACKGROUND OF THE INVENTION

1. Field of the Invention

This invention relates to the preparation of composite structural materials in general and to the formation of composites from extensible resin systems with fiber reinforcements in particular.

2. Prior Art

Fiber reinforced composite systems are well known as structural materials. The closest facsimiles to the present invention known are the chopped commercial fiber-filled systems. However, such fiber incorporations into curable resins yield composites which exhibit mechanical properties totally different from that of composites prepared by the present invention. While prior art fiber filled composites exhibit high moduli, a decrease in percent elongation and strength often results. The behavior of the prior art fiber-filled composites under repeated loading also appears to be totally different from that of composites prepared by the instant invention.

In U.S. application Ser. No. 616,747, Applicant Keller and another disclosed a process for forming polymeric fibers "in situ". This disclosure teaches that fibers formed "in situ" exhibit a randomly oriented three-dimensional interconnected structural network. However, these fibers were formed in a polymerizable medium or were secondarily impregnated with a polymerizable medium which, when subsequently cured formed a rigid matrix with very little capability to elongate under stress. The composites so formed were strong with very low capabilities to strain or deform under load.

While composites prepared by the teachings as disclosed in U.S. application Ser. No. 616,747 have useful applications, they are not useful in applications requiring high flexibility, a lack of deterioration in mechanical properties on repeated loading, as well as high strength composites. Applicants herein sought to extend the teachings of the Ser. No 616,747 application to yield composites which fulfill the requirements of the latter type of applications.

THE INVENTION

Summary

While seeking to develop a reinforced composite structural material exhibiting the advantages of prior art composite systems with few if any of the disadvantages of prior art systems, fiber filled composite systems having extensible matrices were invented.

The composite systems of this invention exhibit unique properties in that they are strong, pliable, and extensible, exhibit an increase in strength and toughness with repeated load cycling and show an excellent retention in ultimate stretch capabilities.

Composites formed per this invention are useful in structural applications such as the fabrication of flexible electrical components, belts for mechanical power transmission, seals, O-rings, tires, gaskets and in any application requiring high strength with elastomeric characteristics.

The composite systems of this invention are composed of extensible resins filled with "in situ" formed fibers arrayed three dimensionally in an interconnected network. The extensible resins may be introduced into the fibers by either monomer solvent polymerization throughout the fiber masses or impregnation of a prepolymer into the fiber masses with subsequent curing.

Detailed Description on the Drawings

Figure 1:
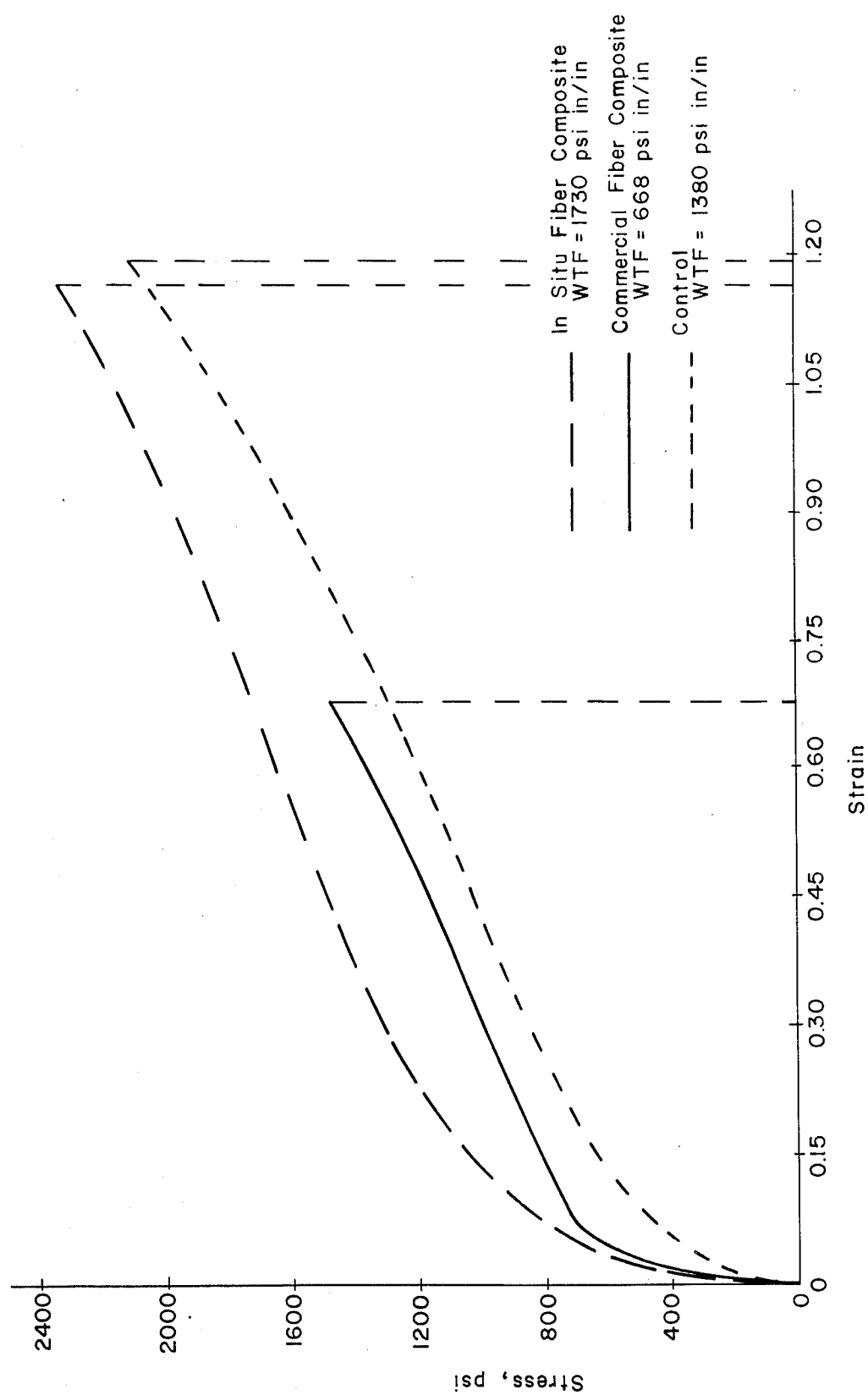
FIG. 1 contains a comparison of the properties of the invention employing a Scotchcast® resin with that of neat Scotchcast® resin and a commercially prepared fiber-filled Scotchcast® resin.

The desirability of forming fiber masses "in situ" was disclosed in U.S. application Ser. No. 616,747. Such a method yields a mass of randomly oriented, interconnected fibers not heretofore possible by prior art methods. Prior art disclosed the formation of fibers from dilute solutions of polymers by extensive mechanical stirring while cooling. These techniques produced a few sparsely distributed fibers oriented spirally around the stirring machanism. The stirring method is too slow for the practical production of fibers and does not produce fibers in the useful massive form of this invention.

It has now been discovered that interconnected fiber masses of polymers formed "in situ" from solutions of said polymers may be impregnated with an extensible curable resin and that the composite formed upon curing of the extensible resin has unique and unusual properties. The unique consequences of the combination of the interconnected fiber networks of our inventions with an elastomeric matrix are as follows:

1. A retention of matrix flexibility during small deformations, i.e., the material exhibits a pliable resilient nature.

2. An increasing strength with repeated deformation or stretching.

3. An increase in toughness with repeated loading, i.e., a work hardening or inverse hysteresis effect.

4. A retention in ultimate stretch capabilities, i.e., the percent elongation at ultimate strength is not decreased by the fiber loading.

The unique behavior described above is apparently due to two properties of the interconnected fiber networks. First, the fiber mesh may endure large deflections and distortions of its original shape and return to that original shape without injury. Second, the individual fibrils of the interconnected network develop additional strength with deformation or stretching within the extensible matrix. An increase in the strength of fibers due to drawing is a well-known effect which is widely used in the textile industry, but drawing in a reversible manner within an extensible matrix is new.

Another unusual aspect of this invention is that unlike conventional structural fiber-reinforced composites, compatability between the fibers and matrix in terms of good wetting and adhesion is not necessary. The network structure of the fiber mass maintains its geometrical integrity upon repeated stretching and relaxation and assures load transfer to the matrix.

These unique composite properties can be attained by combining the "in situ" fiber masses with any of the flexible or elastomeric polymers such as urethanes, silicones, aliphatic rubbers, low fusion temperature plastisols and flexible epoxies limited only by the following qualifications.

a. a sufficiently low viscosity to allow flow into and thus, impregnation of the fiber masses.

b. a cure temperature below that of the fiber melt temperature.

c. a sufficient pot life to allow complete impregnation before curing.

Fiber masses are vibrationally formed from solutions containing solvents which are polymerizable or extractible in a manner described in U.S. application Ser. No. 616,747 and application Ser. No. 707,585 filed herewith. The extensible matrices are introduced by either monomer solvent polymerization throughout the fiber masses or impregnation of prepolymer into the fiber masses with subsequent curing.

Such composites were formed by the impregnation technique using the extensible polymers Scotchcase® 280 and Sylgard® 182 as matrices and polypropylene as fiber masses. Stress/strain curves ar shown in FIG. 1 comparing the behavior of the neat Scotchcast® with the polypropylene fiber mass/Scotchcast® composite.These curves clearly show the increase in toughness (area under the curves) and ultimate strength of the composite over the neat material. Yet, the modulus of the composite (slope of stress-strain curve) and percent elongation have changes little. The Scotchcast, consisting of a polar epoxy structure, offers a certain degree of wettability to the polypropylene fibers. However, with the Sylgard, silicone, this is not the case.

Figure 2:
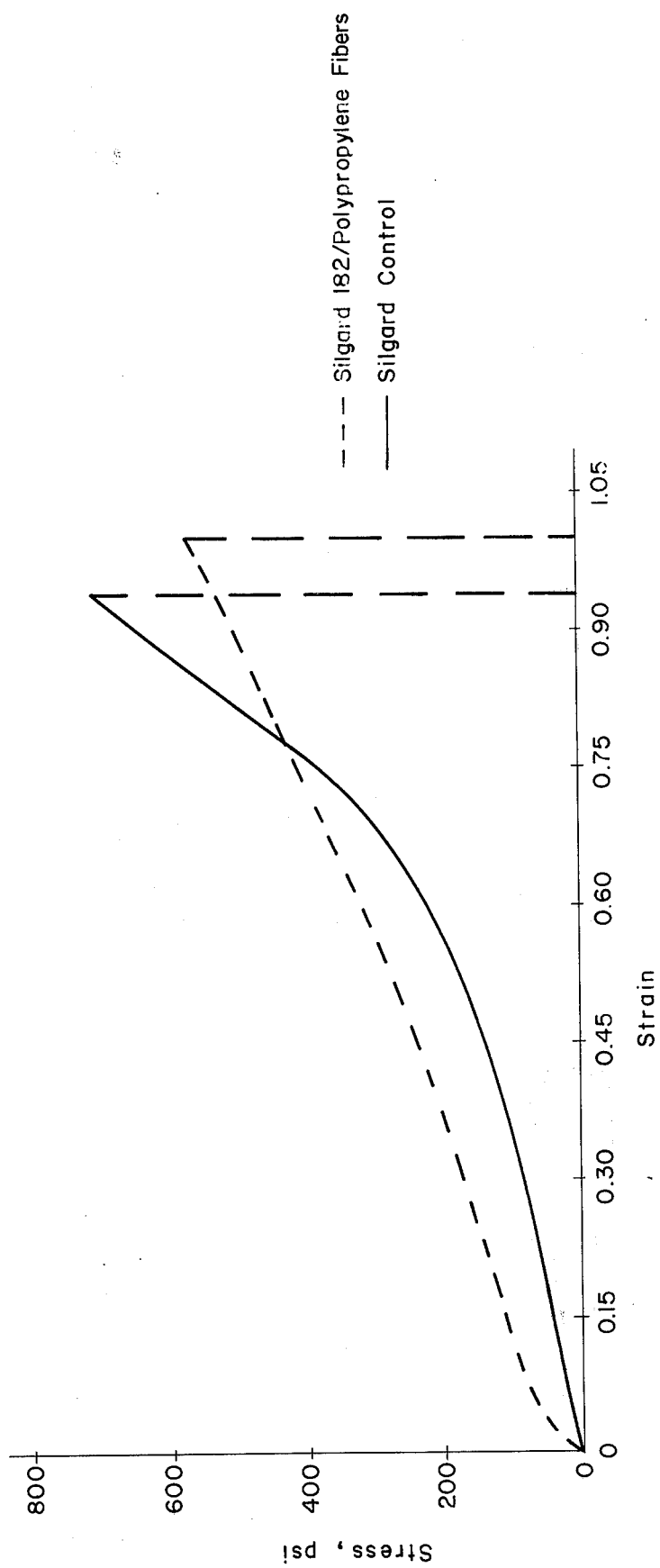
FIG. 2 compares the properties of invention employing a Sylgard® resin with that of the neat resin.
Figure 3:
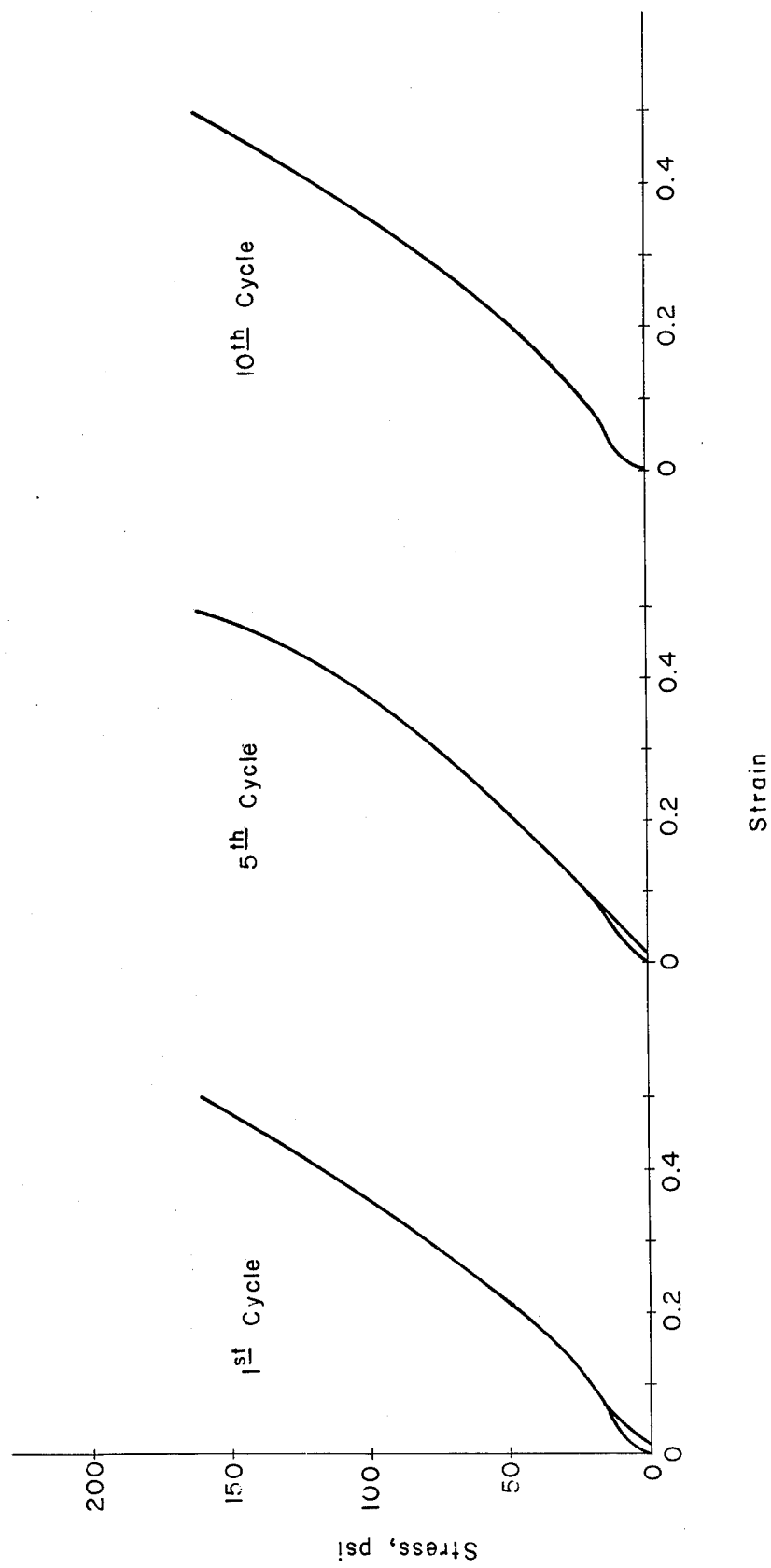
FIG. 3 illustrates the effect of cyclic deformations on the physical properties of neat Sylgard® resin samples.
Figure 4:
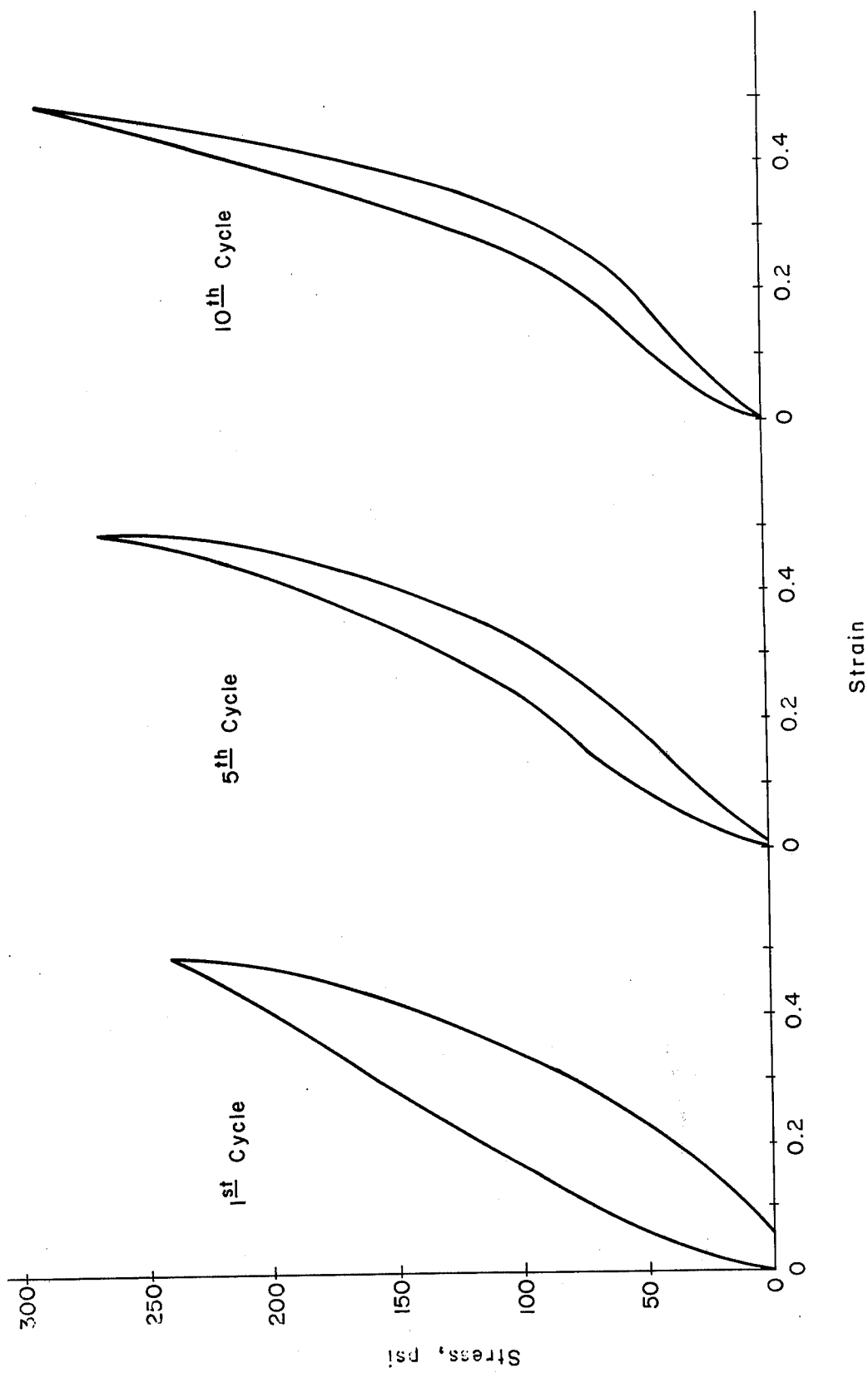
FIG. 4 illustrates the effect of cyclic deformations on the physical properties of the invention as practiced with a Sylgard® resin.
Figure 5:
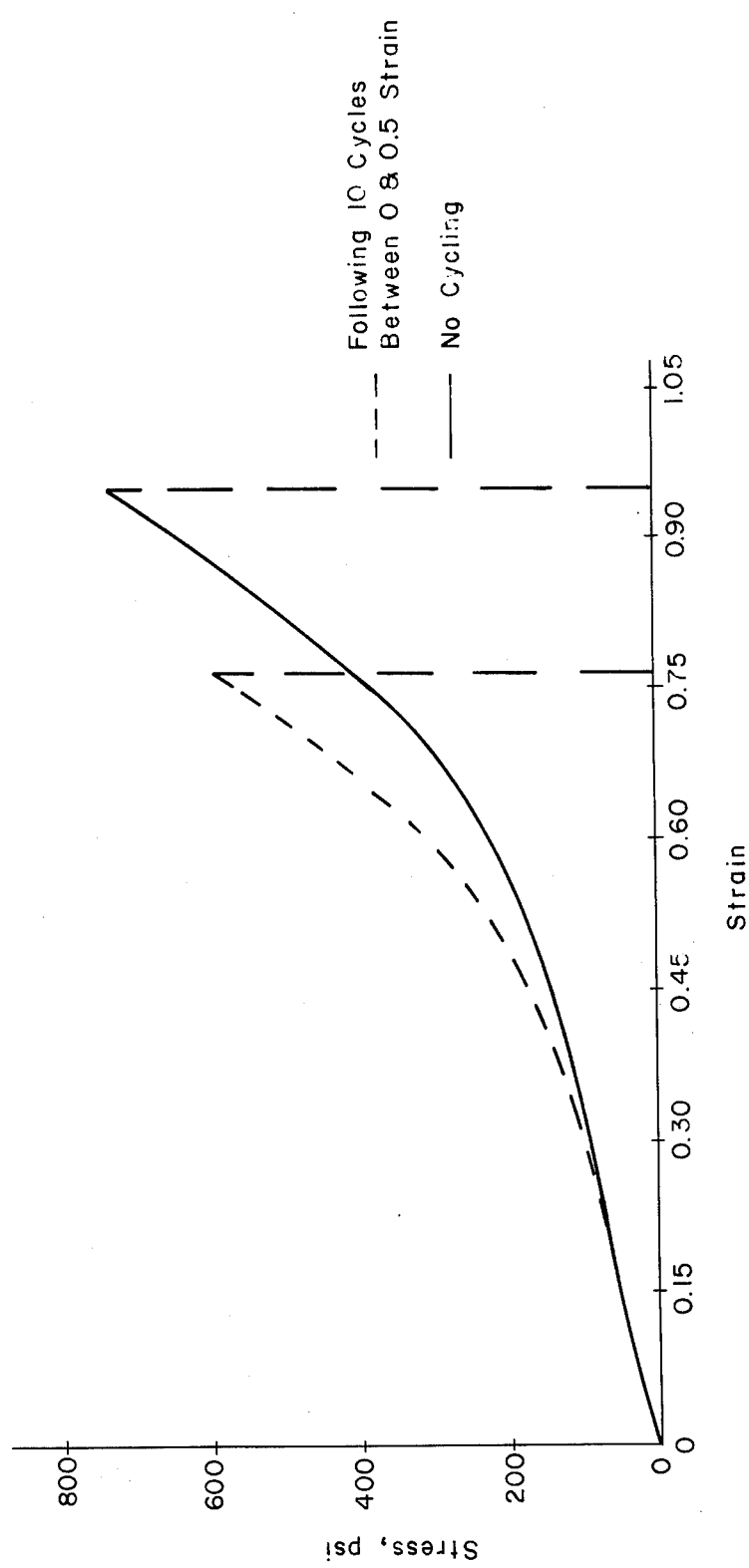
FIG. 5 illustrates the effect of load cycling on neat resin samples.
Figure 6:
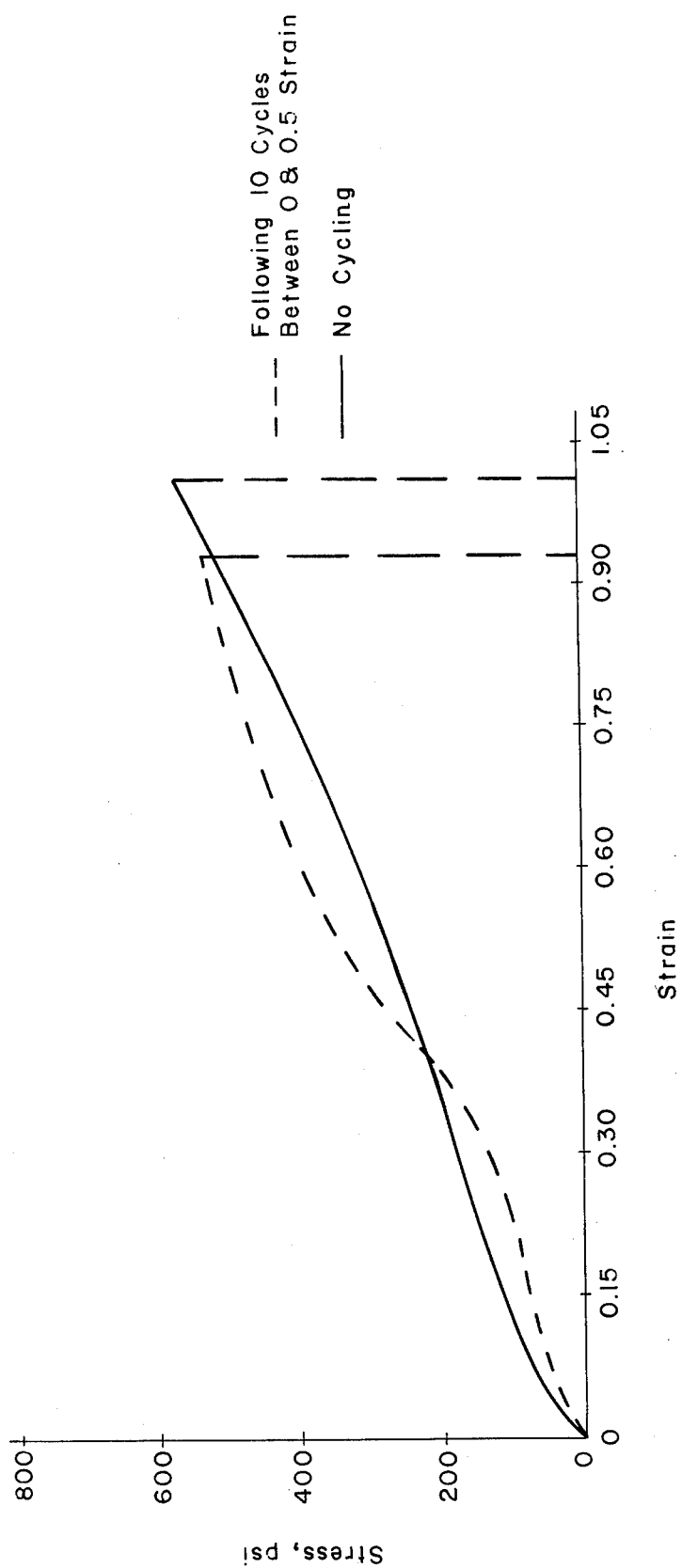
FIG. 6 illustrates the effect of load cycling on composite prepared in accordance with the invention.

Shown in FIG. 2 are stress/strain curves comparing the behavior of neat Sylgard® with the "in situ" polypropylene fiber/Sylgard® 182 composite. Again, the overall toughness of the material has increased with incorporation of the "in situ" formed fibers. In this case, the percent elongation has actually increased. The ultimate strength suffers a little simply because the non-wetting silicone matrix begins to break loose at the higher elongations. Nevertheless, the composite is a tougher material than the neat material over deformations of practical interest, i.e., pre-ultimate. FIGS. 3 and 4 illustrate cyclic stress/strain curves (between 0 and 0.5 strain) for the neat Sylgard® and composite respectively. The neat material yields an elastic behavior with little dissipation in energy. In contrast, the composite yields a material which is capable of dissipating energy, yet increase in strength with repeated load cycling. FIGS. 5 and 6 illustrate the weakening effect of load cycling on the neat material and the strengthening effect of load cycling on the composite respectively.

Composites filled with chopped conventional fibers yield an increase in modulus but a decrease in strength, percent elongation and toughness. FIG. 7 compares the stress/strain curves of nascent Scotchcast® 280 and the composites consisting of "in situ" polypropylene fibers in one case and chopped commercial polypropylene fibers in the other. The strain behavior is significantly changed even at low percent elongations. The conventional fiber-reinforced elastomers exhibit reduced elongation with stress at all levels of loading up to their ultimate strength. The weight percent of polypropylene fibers in the epoxy resin was the same (approximately 7%) in bothcases. These results are even more remarkable when the fact is considered that the conventional polypropylene fibers are highly drawn, high-strength materials with a tensile strength of the order of 40,000 psi.

The Scotchcast® 280 is typical flexibilized bisphenol A based epoxy polymer. It is formed from bisphenol A copolymerized with glycerol and an anhydride curing agent. The material is available from the 3M Company of Saint Paul, Minnesota. The Sylgard® 182 is a conventional silicone rubber material having the generic composition of vinyl terminated dimethyl siloxane, silane curing agent and a platinum catalyst. It is available from the Dow Corning Corp. of Midland, Michigan.

The following specific examples exemplify our invention.

EXAMPLE I (Scotchcast® 280/Fiber Composites)

Polymer solutions were prepared by dissolving isotactic polypropylene in xylene solvent at 125° C. The resulting solutions were vibrationally shaken while cooling until homogeneous fiber masses were formed. Susequently, the xylene was removed from the fiber masses by Soxhlet extraction with acetone. The masses were then dried in vacuum for 24 hours.

The Scotchcast® 280 components were mixed in the ratio of 40 part resin to 60 parts hardener, w/w. The mixture was stirred and then heated to 150° F for 15 minutes to effect thorough mixing. The mixture was then outgassed in vacuo until bubble formation ceased and a pressure as low as $10^{-3}$ mm Hg was attained.

The impregnations of the polypropylene fiber masses were carried out in evacuated flasks. The outgassed resin was introduced slowly via separatory funnels. Each impregnation was conducted in a manner which allowed the resin to permeate the fiber mass from the bottom to an extent which left an excess resin cover. The composites were cured under a positive pressure of 80 psi for 48 hours at 160° F.

EXAMPLE 2 (Sylgard® 182/Fiber Composites)

The fiber masses were prepared in similar fashion to Example I. The Sylgard® 182 components were mixed in the ratio of 100 parts resin to 10 parts hardener, w/w. The mixture was thoroughly mixed and outgassed.

The Sylgard® impregnations were carried out in the same way as for the Scotchcast® resin. The Sylgard® composites were cured for 16 hours at 160° F. There appeared to be no need for positive pressure application.

Having fully disclosed our invention and provided teaching which enable others to make and use it, the scope of our claims may now be understood as follows:

We claim:

1. A composite material comprising a coherent, three-dimensional network of structurally interconnected polymeric fibers impregnated with an extensible resin matrix having a pliable resilient nature, which exhibits the propensity for increasing strength and toughness with repeated load cycling.

2. The material of claim 1 wherein said fibrous masses are formed from linear polyalkenes.

3. The material of claim 1 wherein said fibrous masses are formed from polymers taken from the group consisting of isotactic polypropylene, polyethylene, isotactic poly(4-methylpentene-1), isotactic poly(butene-1), and mixture thereof.

4. The material of claim 3 wherein said resin matrix is selected from the group consisting of curable urethanes, silicones, aliphatic rubbers, low fusion temperature plastisols and flexible epoxies.

5. The material of claim 4 wherein said fibrous mass is a polypropylene fiber and said resin matrix is a silicone resin.

6. The material of claim 4 wherein said fibrous mass is a polypropylene fiber and said resin matrix is a flexible epoxy resin.

7. The material of claim 5 wherein said silicone is comprised of a vinyl terminated dimethyl siloxane, a silane curing agent and a platinum catalyst.

8. The material of claim 6 wherein said flexible epoxy comprises a copolymer of bisphenol A and glycerol with an anhydride curing agent.

* * * * *